US006807405B1

(12) United States Patent
Jagger et al.

(10) Patent No.: US 6,807,405 B1
(45) Date of Patent: Oct. 19, 2004

(54) METHOD AND A DEVICE FOR MAINTAINING THE PERFORMANCE QUALITY OF A CODE-DIVISION MULTIPLE ACCESS SYSTEM IN THE PRESENCE OF NARROW BAND INTERFERENCE

(75) Inventors: Charles E. Jagger, Toronto (CA); Mark N. Willetts, Etobicoke (CA); Micolino Tobia, Woodbridge (CA)

(73) Assignee: ISCO International, Inc., Mt. Prospect, IL (US)

( * ) Notice: Subject to any disclaimer, the term of this patent is extended or adjusted under 35 U.S.C. 154(b) by 0 days.

(21) Appl. No.: 09/301,477

(22) Filed: Apr. 28, 1999

(51) Int. Cl.[7] .......................... H04B 1/10; H04B 7/185; H04B 1/69
(52) U.S. Cl. .................... 455/296; 455/278.1; 455/306; 370/318; 378/148
(58) Field of Search .............................. 455/266, 296, 455/306, 303, 208, 278.1, 316; 375/144, 140, 147, 148; 370/318, 317

(56) References Cited

U.S. PATENT DOCUMENTS

| 3,732,500 A | | 5/1973 | Dishal et al. |
|---|---|---|---|
| 3,781,705 A | | 12/1973 | Dishal et al. |
| 3,783,397 A | | 1/1974 | Dishal et al. |
| 3,887,222 A | * | 6/1975 | Hammond .................... 24/627 |

(List continued on next page.)

FOREIGN PATENT DOCUMENTS

| CA | 2260653 CA | 1/2000 |
|---|---|---|
| CA | 2288633 CA | 4/2000 |
| CN | 1173101 A | 2/1998 |
| EP | 0 704 986 A2 | 4/1996 |
| EP | 0 812 069 A2 | 12/1997 |
| EP | 0 704 986 A3 | 5/2000 |

OTHER PUBLICATIONS

H. Vincent Poor, et al., "Narrowband Interference Suppression in Spread Spectrum CDMA", IEEE Personal Communications Magazine, Third Quarter, 1994, pp. 14–27.
L. Milstein, "Interference Rejection Techniques in Spread Spectrum Communications", Proceedings of the IEEE, vol. 76, No. 6, Jun. 1988.
European search dated Mar. 27, 2000.
Written Opinion for International Application No. PCT/CA00/00100 dated Mar. 2, 2001.
International Preliminary Examination Report for International Application No. PCT/CA00/00100 Dated Apr. 27, 2001.
First Office Action in China for Application No. 00803299.8 dated Jun. 6, 2003.

*Primary Examiner*—Charles N. Appiah
(74) *Attorney, Agent, or Firm*—Marshall, Gerstein & Borun LLP

(57) ABSTRACT

A method and device which dynamically detects, tracks and filters interfering signals with sufficient speed (i.e. within one IS-95 CDMA data. frame period, or 20 ms) and fidelity to eliminate or greatly reduce the deleterious effects of narrow band interferer signals on a CDMA link. When inserted in an RF signal path an Adaptive Notch Filter (ANF) detects narrow band interferors above a threshold level within the CDMA signal. Detection is accomplished by continuous scanning of a preset excision band, e.g. a specified narrow band associated with an AMPS system. Detected interferors are then automatically acquired and suppressed. This is achieved by electronically placing a rejection notch at the frequency of the interferors. Multiple notch filters may be used to simultaneously suppress multiple interferors. In the absence of interferors a bypass mode is selected allowing the RF signal to bypass the notch. Upon detection of an interferer, a switch is made to a suppression mode where the interferor is steered through a first notch section and suppressed. Alternatively, an external control line may be used to select the bypass mode so that the signal is allowed to pass the notch section, regardless of interferer content.

65 Claims, 6 Drawing Sheets

U.S. PATENT DOCUMENTS

| | | | | |
|---|---|---|---|---|
| 3,911,366 A | | 10/1975 | Baghdady | 325/347 |
| 4,027,264 A | | 5/1977 | Gutleber | 328/167 |
| 4,328,591 A | | 5/1982 | Baghdady | 455/303 |
| 4,513,249 A | | 4/1985 | Baghdady | 328/150 |
| 4,805,126 A | * | 2/1989 | Rodems | 330/107 |
| 4,859,958 A | | 8/1989 | Myers | |
| 4,919,640 A | * | 4/1990 | Yanagibori | 455/164.1 |
| 4,947,361 A | * | 8/1990 | Smith et al. | 708/312 |
| 4,992,747 A | | 2/1991 | Myers | |
| 5,038,115 A | | 8/1991 | Myers et al. | |
| 5,097,221 A | * | 3/1992 | Miller | 329/318 |
| 5,168,508 A | | 12/1992 | Iwasaki et al. | |
| 5,185,762 A | | 2/1993 | Schilling | 375/1 |
| 5,193,210 A | * | 3/1993 | Nicholas et al. | 307/10.2 |
| 5,226,057 A | | 7/1993 | Boren | |
| 5,263,048 A | | 11/1993 | Wade | 375/1 |
| 5,307,517 A | | 4/1994 | Rich | 455/306 |
| 5,325,204 A | | 6/1994 | Scarpa | |
| 5,343,496 A | | 8/1994 | Honig et al. | |
| 5,410,750 A | * | 4/1995 | Cantwell et al. | 375/148 |
| 5,541,959 A | | 7/1996 | Myers | 375/348 |
| 5,570,350 A | | 10/1996 | Myer et al. | 370/18 |
| 5,613,230 A | * | 3/1997 | Gottfried et al. | 455/161.3 |
| 5,640,385 A | * | 6/1997 | Long et al. | 370/335 |
| 5,703,874 A | | 12/1997 | Schilling | 370/335 |
| 5,758,275 A | | 5/1998 | Cox et al. | |
| 5,974,101 A | | 10/1999 | Nago | |
| 5,978,362 A | | 11/1999 | Lee et al. | |
| 6,020,783 A | | 2/2000 | Coppola | 327/556 |
| 6,035,213 A | | 3/2000 | Tokuda et al. | 455/553 |
| 6,047,171 A | * | 4/2000 | Khayrallah et al. | 455/266 |
| 6,104,934 A | | 8/2000 | Patton et al. | 455/561 |
| 6,115,409 A | * | 9/2000 | Upadhyay et al. | 375/144 |
| 6,205,334 B1 | * | 3/2001 | Dent | 455/434 |
| 6,215,812 B1 | * | 4/2001 | Young et al. | 375/144 |
| 6,426,983 B1 | * | 7/2002 | Rakib et al. | 375/346 |

* cited by examiner

METHOD AND A DEVICE FOR MAINTAINING THE PERFORMANCE QUALITY OF A CODE-DIVISION MULTIPLE ACCESS SYSTEM IN THE PRESENCE OF NARROW BAND INTERFERENCE

BACKGROUND OF THE INVENTION

1. Field of the Invention

The present invention generally relates to wireless communications, and more particularly to use of notch filters to minimize the adverse affect of narrow band interference upon the performance of code-division multiple access systems.

2. Background Description

The worldwide market for wireless phone service is experiencing growth at an accelerated rate. It is well known that service reliability and performance are key competitive criteria in the telecommunications industry. Existing and new 800 MHz Code-Division Multiple Access (CDMA) wireless sites are in need of a solution to address problems caused by narrow band interfering signals, such as those generated by existing analog sites which continue to provide cellular coverage in urban and non-urban areas.

When deploying a CDMA telecommunications system within a frequency spectrum traditionally allocated to narrow band systems, such as the Analog Mobile Phone System (AMPS) or Global System for Mobile communications (GSM), a frequency block slightly wider than the bandwidth of the CDMA spectrum is normally cleared, in and around the geographic region of the CDMA coverage, to protect the CDMA system from narrow band interference and hence maintain the performance quality of the system. However, it is not always practicable or economical, and in some cases not possible, to clear all the required spectrum. An example where it may be impossible is in country or state boundary regions. Deleterious effects of narrow band interference on CDMA telecommunication systems include: an increase in blocked call and dropped call rates, disruption of the RF power control system, increase in average mobile station-power consumption, reduction of cell capacity, and shrinkage of cell site coverage area. In the worst case, a high level interferer can jam the entire cell or sector, blocking all CDMA communications which would normally be routed through the location.

The use of adaptive notch filters in communications is not new. U.S. Pat. No. 3,911,366 to Bagdhady describes a frequency demodulation receiver for separating a stronger and weaker signal, and removing the undesired signal. Baghdady's invention employs a first mixer, a bandpass filter with a fixed tuned trap (notch), and a second mixer, to achieve a frequency variable notch filter. This filter bears some similarities to the frequency variable notch filter employed in this invention, however, Baghdady addresses only two FM signals and does not address scanning of a broadband signal for multiple narrowband interferors or tracking such interferors and notching them after acquisition.

U.S. Pat. No. 4,027,264 to Gutleber describes a system that scans over the spectral range of an intelligence bearing signal and locks onto and tracks the interfering signal. But the interfering signal is excised by generating a replica and subtracting that replica from the intelligence bearing signal.

U.S. Pat. No. 5,307,517 to Rich describes an improved adaptive notch filter for removing undesired cochannel FM interference, using an approach similar to that employed by Baghdady. The incoming signal is frequency translated to baseband signals and sent through a high pass filter.

U.S. Pat. No. 5,263,048 to Wade describes a method for excising narrowband interferors in a spread spectrum signal, wherein the incoming signal is digitized and transformed to the time domain and then the amplitude of the signal is discarded and replaced with a normalized value.

U.S. Pat. No. 5,703,874 to Schilling describes a spread spectrum CDMA communications system for operation within the same geographic region as occupied by a mobile-cellular system, the spectrum of which overlays the operating frequency of the mobile-cellular system. In this invention, the base station employs a comb filter for attenuating predetermined channels of the mobile-cellular system. It does not seek and attenuate narrowband transmissions at arbitrary frequencies and occurrences.

U.S. Pat. No. 5,640,385 to Long et al. describes a system for simultaneous wideband and narrowband communication, where the narrowband FM signal is embedded in the wideband signal in the base station transmitter circuitry. A notch filter is employed in the receiving circuitry and simultaneous narrowband and wideband wireless communication is supported, i.e. both the narrowband and wideband signals are recovered. Long et al. describes a system for employing both wideband and narrowband signals in an overlapping spectrum. In particular, the system embeds narrowband signals within the wideband frequency band to form a composite wideband signal, and it is important that narrowband and wideband carriers be transmitted from a common transmitter; the receiver in this system takes this composite signal, digitizes, transforms and frequency filters it so as to separate the individual narrowband and wideband signals contained in the composite. The invention provides means for optimizing the capacity of a system using such composite signals. However, Long et al. does not address the problem of conflicting systems, where a wideband system is faced with interference from narrowband signals from other systems which appear at random within the wideband spectrum.

SUMMARY OF THE INVENTION

It is therefore an object of the present invention to reduce the adverse effects of narrow band interference on CDMA communication systems, by employing an adaptive notch filter and, in wireless telecommunications applications, thereby restoring blocked call and dropped call rates, reducing or eliminating disruption of the RF power control system, avoiding increases in average mobile station power consumption, maintaining cell capacity, and maintaining cell site coverage area.

Another object of the invention is to prevent a high level interferer from jamming an entire cell or sector, blocking all CDMA communications which would normally be routed through a location.

It is a further object of the invention to provide a more convenient, less complex and less expensive method for overcoming narrow band interference.

The invention provides a device for suppressing narrow band interference in a wideband telecommunications system. Means are provided for rapidly analyzing the wide frequency band with respect to signal power levels in specified narrow frequency bands and detecting narrow band signal power levels received within the specified bands. There is shown how to derive an average composite wideband power level from signal power levels in the specified narrow bands, and then how to use these signal power levels to derive an adaptive threshold for identifying the narrow band interference. Finally, means are provided for setting one or more notch filters for suppressing the identified narrow band interference.

In accordance with the invention as applied to wideband CDMA systems, the spectrum used by the wideband CDMA signal (e.g. having a band of 1.23 MHz) is frequency scanned for narrowband analog signals (e.g. having a band of 30 KHz). An identified frequency band is then assigned to a notch filter and excised. A notable feature of the invention is that this process is fast—in contrast to more generic methods of filtering which take more time to be effective—and appears to a telecommunications user as no more than a brief "click" in reception, if at all, and excises the interferer quickly enough to prevent or greatly reduce the probability of the occurance of a blocked or dropped call due to the interference.

A further notable feature of the invention is that additional notch filters may be added to allow removal of multiple interferors. In a preferred embodiment of the invention, responsive to an environment where there are more interferors than notch filters, those interferors with the largest amplitude are assigned to the notch filters.

The present invention solves or mitigates the problem of narrow band interference in a manner which is less expensive and more convenient than other methods, and in some cases can complement other methods. The most common alternate method is to employ an Adaptive Antenna Array at the base station or mobile station. These systems are expensive and complex, and require installation of tower top antennas and other equipment The present invention requires minimal alteration of existing base station equipment and software. Installation is simple and is not time consuming, and may be accomplished without specialized personnel because it merely requires connecting a device in the receiver RF signal path, preferably after the Low Noise Antenna (LNA). The invention dynamically detects, tracks and filters the interfering signals with sufficient speed and fidelity to eliminate or greatly reduce the deleterious effects of narrow band interfering signals on the CDMA link.

The solution requires the installation of one Adaptive Notch Filter (ANF) unit on at least one of the CDMA receivers located at each cell site. When inserted in an RF signal path the ANF detects narrow band interferors above a threshold level within the CDMA signal, and then automatically acquires and suppresses the interferors. This is achieved by electronically placing a rejection notch at the frequency of the interferors. Multiple interferors may be simultaneously suppressed depending upon the number of notch filter modules installed in the equipment.

The invention enables continuous scanning of a preset excision band to detect interferors. In the absence of interferors a bypass mode is selected allowing the RF signal to bypass the notch. Upon detection, the interferer is acquired and in accordance with the invention a switch is made to a suppression mode where the interferer is steered through the first notch section and suppressed. Multiple interferors are sorted according to level and the highest level interferors are selected and suppressed, up to the number of cascaded notch filters. Alternatively, an external control line may be used to select the bypass mode so that the signal is allowed to pass the notch section, regardless of interferer content.

The invention implements a rapid functional test which has sufficient operational alarms and metrics to allow an operator, either locally or remotely through an RS232 interface, to determine the characteristics of the interferors and averaged received composite CDMA power level Another aspect of the invention is modular construction which allows the rapid removal and replacement of functional circuit elements, i.e. power conditioner, scanner, notch filter, and operational alarms and metrics modules. The invention comprises all four modules, but may readily be expanded by the addition of notch filter modules. At a practical level, of course, if there are a large number of interferors and all of them are notched, there is a point at which there is not enough energy left in the desired signal to be decoded. While the disclosed method is specifically adapted for base station interference control, it can also be adapted to the mobile unit.

Furthermore, the invention is applicable to a variety of environments where a wideband system looks upon narrowband signals as interferors which must be excised in order to preserve the performance quality of the wideband system. The description herein uses Advanced Mobile Phone Service (AMPS) as the source of narrowband signals, but the invention applies equally to other comparable narrowband sources such as GSM (the European Global System for Mobile communications).

BRIEF DESCRIPTION OF THE DRAWINGS

The foregoing and other objects, aspects and advantages will be. better understood from the following detailed description of a preferred embodiment of the invention with reference to the drawings, in which.

DETAILED DESCRIPTION OF A PREFERRED EMBODIMENT OF THE INVENTION

Figure 1:
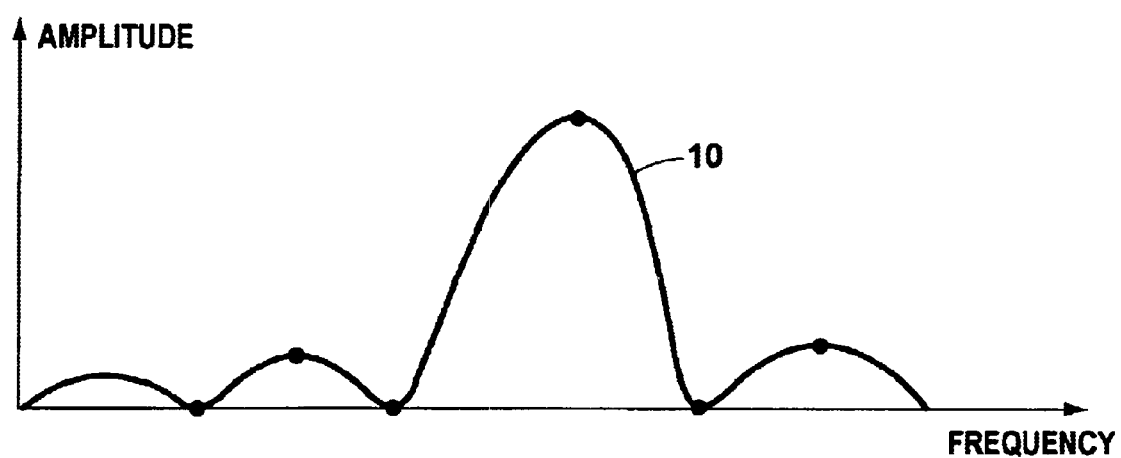
FIG. 1 is a graphical representation of the spectrum of a spread spectrum signal.

While the concept of employing a notch filter in CDMA communications is not new, the present invention employs an interference tracking system with multiple notch filters. The detection and tracking function of the invention is adapted to provide a number of features and attributes which are advantageous. First, the invention employs a single fast acting scanner and detector which detects and records all the narrowband channel received signal levels within the CDMA spectrum, and derives the average composite CDMA power. Using this power measurement, an adaptive threshold is derived for detecting the presence of narrowband interference. This threshold varies as the composite received CDMA power varies. Such an adaptive threshold has an advantage over a fixed one, since a fixed threshold may result in false detection of interference when the composite received CDMA power is relatively high.

Second, the largest N channels having levels which exceed the adaptive threshold are identified for setting N cascaded notch filters. The detector features hysteresis, where the ON threshold is set higher than the OFF. This reduces the degree of on/off "chattering" of the notch filter switching function. The received signal level of a mobile interferor will fluactuate due to multipath, therefore, to avoid undesirable switching on and off of the associated notch filter, a count of the consecutive number of times the signal goes below the OFF threshold is made, and the notch filter is switched out only when a predetermined number has been exceeded. Third, the entire process of scanning, identifying interfering signals, and setting the notch filters is accomplished within a time period which is less than one IS-95 CDMA data frame period (20 ms). This minimizes the disruption of the power control system by limiting the escalation of mobile power in an attempt to overcome the interference, and eliminates or greatly reduces the probability that a call will be blocked or dropped due to the interference. The ability of the invention to operate within this time period is due in part to the fact that the narrowband interferors are known to occur in specified narrow frequency bands, e.g. the bands associated with AMPS, which therefore can be discretely assigned to notch filters.

The invention can optionally provide the following useful information to the cellular system manager: time of occurrence, frequency, and duration of interfering signal presence. In addition, periodic records can be made of the composite received CDMA power level. Also, a laptop or personal computer can collect and process channel level data transmitted from the notch filter system and graphically display the CDMA and guard band spectrum, for base station service personnel and engineers. Furthermore, the scanner and detector can be designed to detect the presence of frequency hopped GSM signals and concurrently dehop multiple GSM interferors, transmitting the appropriate frequency hopping sequence to each of the notch filters.

The filtering function of the invention is adapted to provide several advantageous performance attributes. First, several notch filters can be cascaded to handle the degree of interference experienced. Time to acquire and notch interfering signals is not directly proportional to the number of interfering signals, and in fact increases negligibly with the number of interferors. Second, each notch filter module consists of a first mixer, a local oscillator (LO), a bandpass filter and notch filter at an intermediate frequency (IF), and a second mixer. The effective center frequency of the notch frequency is set by tuning the LO. Third, each notch filter module also features an RF bypass switch to bypass the RF signal when notching is not required, and the notch filter system has a fail-safe bypass RF switch to bypass the system in the event of power loss or other failure modes in the system. Fourth, each notch filter module provides unity gain, and the overall gain of the adaptive notch filter system is unity. This facilitates the modularity of the system, since notch filter modules can be installed or removed, or switched in or out, or the entire adaptive notch filter system can be bypassed, removed, or re-installed, without changing receiver RF gain. Modularity is further facilitated by setting the bypass delay approximately equal to the notch module delay. Fifth, the control module senses the number of and position of notch modules that are present and operational, and adjusts the control algorithm accordingly. Sixth, the total absolute delay in the cascaded notch filter path is limited to a value which does not result in unanticipated hand-offs due to associated increases in mobile to base station distance estimates.

Optionally, the notch module can demodulate the narrowband FM interferer and use this signal to modulate the notch module LO, thus tracking the interferor. This technique can be used to reduce the complexity of the notch filter design or avoid excessive filtering of the CDMA signal, since the effective filter bandwidth adapts to the spectral width of the interferor. It allows the use of notch. filters of substantially narrower band than the interferer spectrum. This technique is applicable to CDMA overlay on GSM, since the GSM channel is much wider than the AMPS channel (200 kHz vs 30 kHz).

Figure 2:
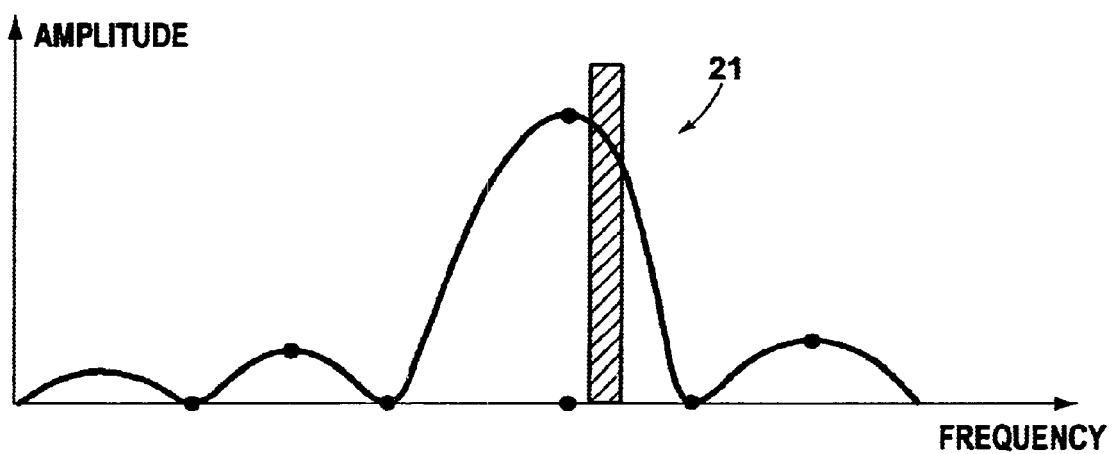
FIG. 2 is a graph showing a spread spectrum signal plus a narrowband interferer.

The spectrum of a spread spectrum signal 10 is shown in FIG. 1. The basic problem addressed by a notch filter is that this signal 10 and a narrow band interferer signal 21 occupy the same band, as shown in FIG. 2. If the strength of the narrow band. interference 21 is such that it exceeds the signal to jamming ratio of the spread spectrum signal 10, it is capable of deteriorating or eliminating any communication being made in the spread spectrum system.

Figure 3:
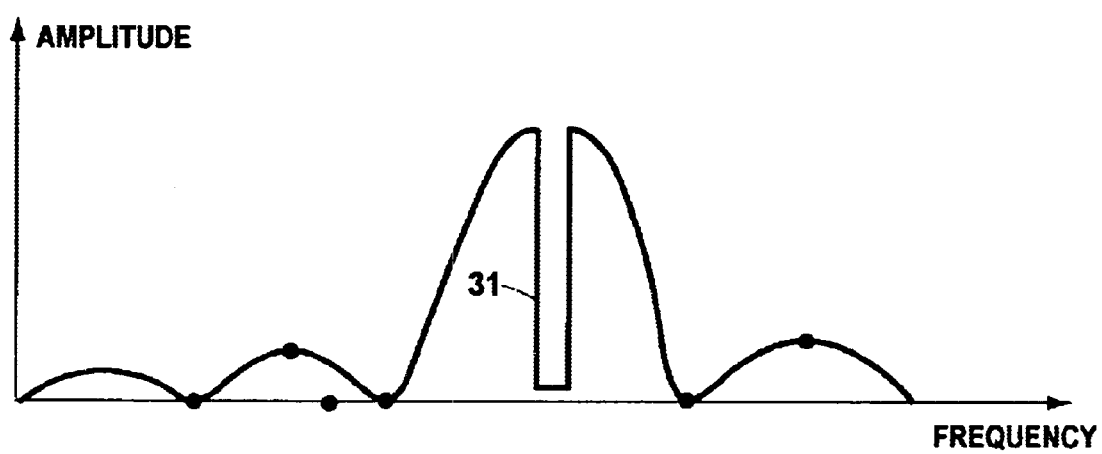
FIG. 3 is a graph showing a spread spectrum signal after interferer excision.

If on the other hand, the summed signals of FIG. 2 are passed through a notch filter located at the frequency of the narrow band signal 21 (with a resulting notch 31 as shown in FIG. 3) communication is restored, although there will be deterioration of communication to a degree proportional to the amount of energy removed from the spread signal by the notch filter. That energy removal is a residual interference not eliminated by the notch filter.

Obviously, the interference can occur anywhere in spread spectrum (SS) band, and it is desirable that the notch filter be tuneable, i.e. that the notch filter be locatable at any frequency on the band where there is a interferer. Notch filters tuneable over a wide band while maintaining consistent attenuation characteristics are very difficult, if not impossible to implement. Rather, it is much more feasible to design narrow band notch filters with high Q elements (Xtals, SAWS, HELICAL FILTERS, etc.) at particular frequencies.

Figure 4:
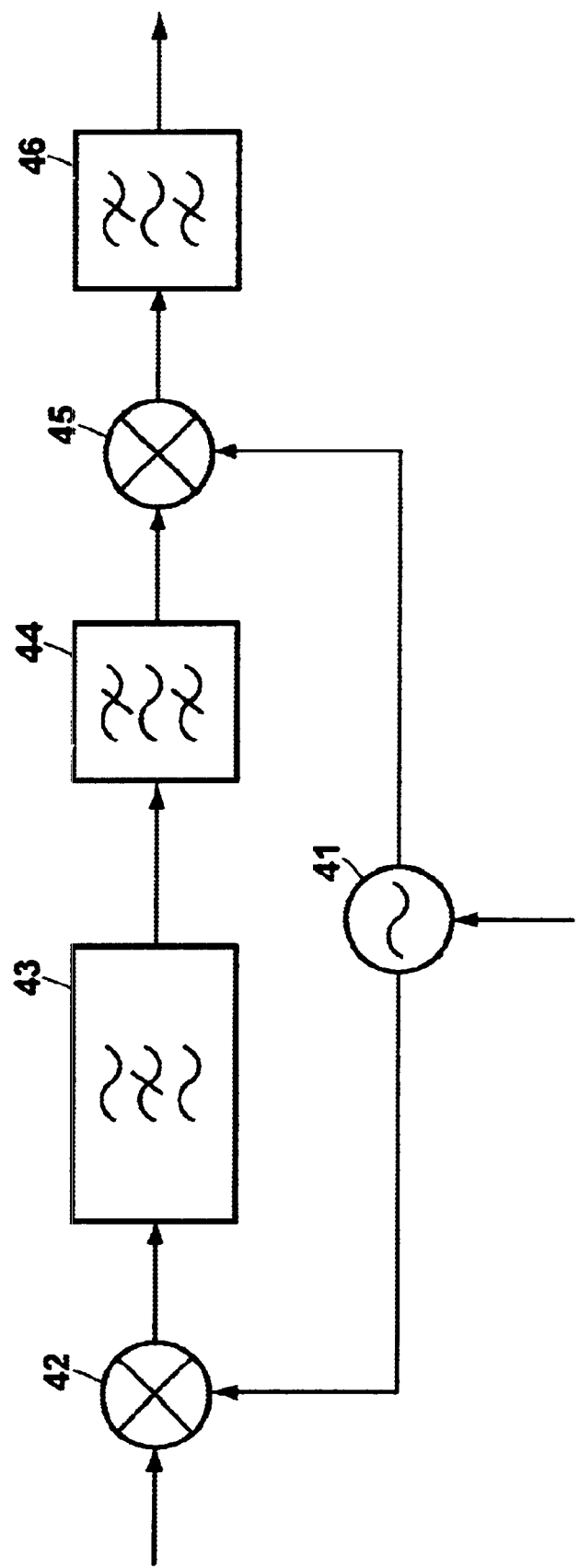
FIG. 4 is a block diagram showing the operation of a notch filter.

Turning now to FIG. 4, the tuning action required is achieved by sweeping the spread spectrum signal past the fixed notch and subsequently stopping this sweep when the interfering signal is detected The sweeping action is obtained through the use of a voltage controlled local oscillator 41 and down converter 42. The SS signal is at an intermediate frequency where it is convenient and economical to realise the notch filter 43. After removal of the interferer by the notch filter 43, the resulting "cleaned up" SS signal is returned to its original frequency by the up converter 45 using LO 41.

The addition of a bandpass filter 44 centered at the IF and somewhat greater in bandwidth than the sweep range of the VCO 41 and the bandwidth of the SS signal is used to select the lower sideband of the down conversion process. Similarly, another band pass filter 46 is used at the output of the up converter to again select the lower sideband of the mixing process. As may be readily seen, the upper sidebands of the respective conversions may also be chosen, as can a choice of $F_{vco}<F_c$, with equally valid results. The particular selection of $F_{vco}>F_c$ eases the realisation of the filtering requirements.

Figure 5:
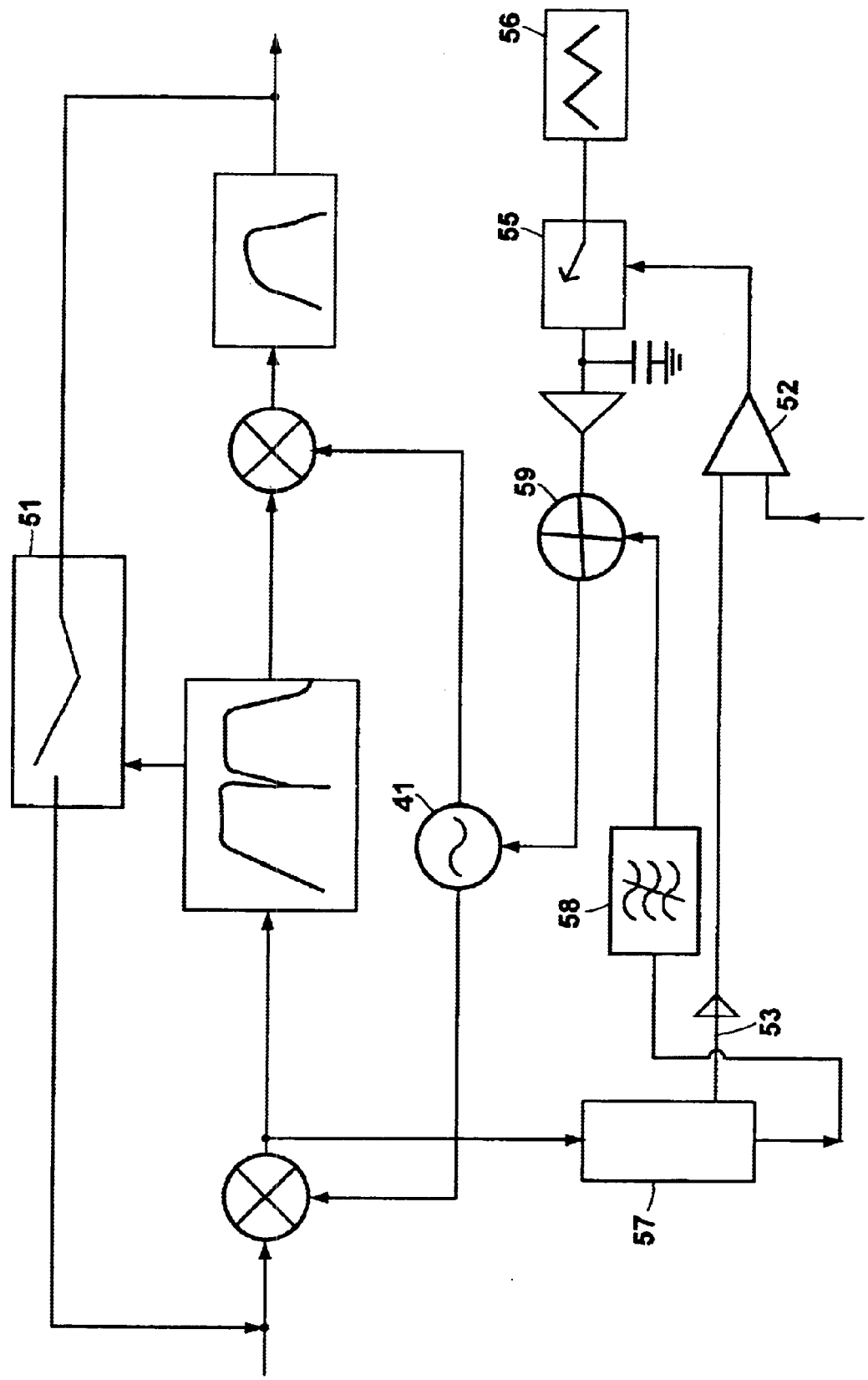
FIG. 5 is a block diagram of a notch filter module in accordance with the invention.

As yet missing from the process is of course the means by which the VCO sweep is halted at the correct frequency that places the interferer in the notch filter. This function is provided by an adaptation of a signal scanning or searching receiver 57 as shown in FIG. 5. This scanning receiver is comprised of a narrow band, single conversion FM detector with a received signal strength indicator (RSSI)53. The FM detector is used to receive narrowband signals at exactly the same frequency as that of the notch filter. Thus, when an interfering signal is present it is detected and its amplitude level is determined by the RSSI voltage. The RSSI voltage 53 is subsequently compared to some preset threshold 54. The resultant comparator output 52 is used to halt the sweep driving the VCO 41. Simple sample and hold circuitry 55 clamps the DC value of the sawtooth generator 56 sweeping the VCO 41 and correspondingly sets the VCO 41 at the appropriate frequency to receive the interfering signal; and thereby the VCO 41 sets the effective notch filter to excise the interfering signal from the SS signal. Inclusion of discriminator 57 in the scanner output allows an AFC (automatic frequency control) loop 58 to be closed, including the VCO 41. This maintains the notch position as long as the jamming is present. The loop parameters when appropriately chosen also allow the notching action to track FM signal deviations.

A realisation of the overall circuit appears as in FIG. 5, which can be considered as a module for the removal of one narrow band interferer. Note that the bypass switch 51 has been added to preclude any signal deterioration when no jamming is present. This is controlled by the opposite state to the activated comparator 52. Up to a reasonable point, these modules can be cascaded to remove a number of interferors. This "reasonable point" is related to the bandwidth of the notch filter (i.e. the amount of signal energy removed from the spread spectrum increases with the addition of each notch) and the practical problems of intermodulation products that are generated with a large number of interferors.

Figure 6:
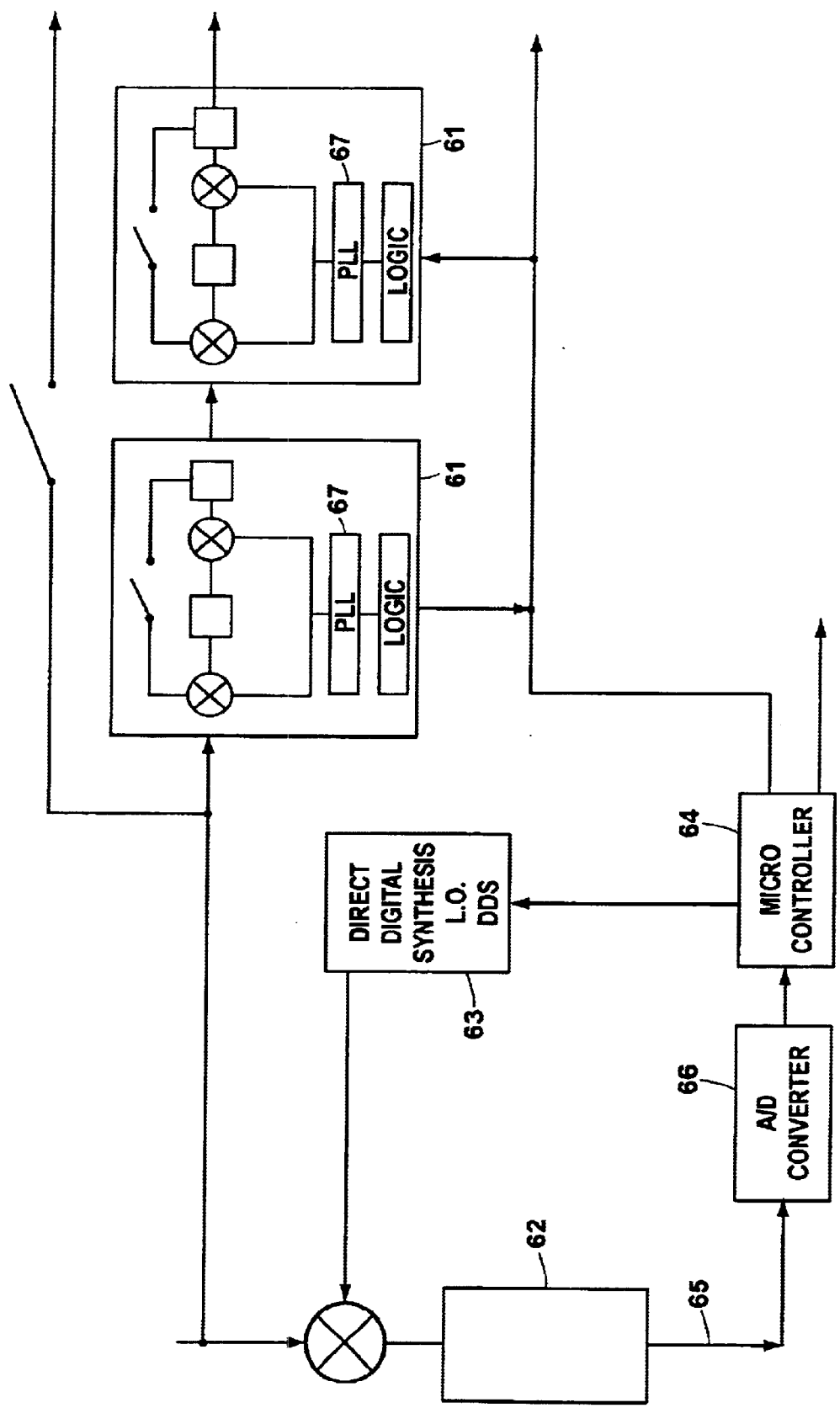
FIG. 6 is a modification of FIG. 5, adapting the invention for use with multiple notch filters where AMPS signals are interferers of CDMA signals.

FIG. 6 is a modification of FIG. 5, intended for use in cellular base stations, located in areas where AMPS signals are received and co-located in the band of CDMA signals. The individual notch modules 61 perform the same function as described previously, however they do not contain an FM receiver or a swept VCO. This detection function is now handled in a scanning FM receiver 62. It will be noted that removal of the receiver from each of the notch modules does not permit a frequency tracking function to be obtained. However, because the parameters of the potential interferors (AMPS) are known in both frequency and bandwidth, this capability is not required.

In FIG. 6, the direct digital synthesiser (DDS) local oscillator 63 repeatedly tunes the narrow band FM receiver 62 through the CDIAA band and in AMPS channel steps (i.e. 30 KHz), each step being generated by a digital word sent to the DDS from a microcontroller 64. The RSSI output 65 of the FM receiver provides a voltage proportional to the power (in dB) in each of the signal channels. This RSSI voltage is analogue to digital converted (at A/D Converter block 66) and stored for processing in microcontroller 64. The RRSI level is compared to the notch filter ON threshold, and if it exceeds it, a notch filter is assigned to the channel, if one is available. If all notch filters are in use, the RSSI level is compared to the lowest level of the notched interferors, and if it exceeds this value, the frequency of this notch will be changed to the new channel. The notch filter center frequency is modified by sending a control word to a phase lock loop (PLL) 67 that sets up the proper LO frequency for the down and up conversions in each notch module. This LO generated by the PLL 67 through the information from the microprocessor 64, places the notch at the appropriate frequency to excise the AMPS channel A prioritising function, in the microcontroller 64 software, selects those signals, for elimination by the notch modules 61, which are the strongest and capable of doing the most damage to the composite CDMA signal. Although the number of notch modules 61 which can be used is limited only by the practical considerations of economics and signal path distortions, the number should be matched statistically to the potential threat. The weaker signals that are not notched, if they are not contained by the jamming margin of the CDMA signal, will be ameliorated by the power control link between the base station and the mobile.

Here the base station circuits determine an increase in errors of the received signal and send a command signal to the mobile transmitter to increase its power.

The microprocessor 64, in addition to its duties for the notching actions, senses equipment faults enabling a bypass mode should a fault occur. Also, provided is a built in test equipment (BITE) function and a means of averaging the RSSI outputs over the whole CDMA spectrum to assess the received power level of the latter. The data thus obtained is used for threat analysis, signal analysis and housekeeping functions. These are made available locally at the base station and remotely.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A device for suppressing narrow band interference in a wideband telecommunications system, said system being operable in a wide frequency band, comprising:

means for rapidly analyzing said wide frequency band with respect to signal power levels in specified narrow frequency bands and detecting said narrow band signal power levels received within said specified bands, means for deriving an average composite wideband power level from said narrow band signal power levels;

means for using said signal power levels to derive an adaptive threshold for identifying said narrow band interference;

means for setting one or more notch filters for suppressing said identified narrow band interference.

2. The device of claim 1, wherein said wideband system is a CDMA system and said specified frequency bands are determined from an AMPS system.

3. The device of claim 2, wherein said analysis means, said deriving means, said identifying means and said setting means all are accomplished within one IS-95 CDMA data frame period.

4. The device of claim 1, wherein said detecting means can be adapted to detect the presence of frequency hopped GSM signals and concurrently dehop multiple GSM interferors, transmitting the appropriate frequency hopping sequence to each of said notch filters.

5. The device of claim 1, wherein said notch filter comprises:

a first mixer;

a voltage controlled oscillator;

a narrowband fixed frequency filter with integral wider bandpass filter; and a second mixer, wherein said first mixer and said voltage controlled oscillator heterodyne a radio frequency signal to an intermediate frequency signal, said intermediate frequency signal then being both notch filtered and-bandpass filtered, wherein said second mixer translates said filtered signal back to said radio frequency.

6. The device of claim 5, wherein said notch filter is bypassed by means of a radio frequency switching circuit when no interferer is detected, wherein said switching circuit has a switching threshold which is higher for switching in the notch filter than for bypassing the notch filter.

7. A method for suppressing narrow band interference in a wideband telecommunications system, said system being operable in a wide frequency band, comprising the steps of:

rapidly analyzing said wide frequency band with respect to signal power levels in specified narrow frequency bands and detecting said narrow band signal power levels received within said specified bands;

deriving an average composite wideband power level from said narrow band signal power levels;

using said signal power levels to derive an adaptive threshold for identifying said narrow band interference; and setting one or more notch filters for suppressing said identified narrow band interference.

8. The method of claim 7, wherein said wideband system is a CDMA system and said specified frequency bands are determined from an AMPS system.

9. The method of claim 8, wherein said analyzing step, said deriving step, said identifying step and said setting step all are accomplished within one IS-95 CDMA data frame period.

10. The method of claim 7, wherein said detecting step includes means for selectively detecting the presence of frequency hopped GSM signals and concurrently dehoping multiple GSM interferors, transmitting the appropriate frequency hopping sequence to each of said notch filters.

11. A method of detecting and eliminating narrowband interference in a wideband communication signal having a frequency bandwidth with narrowband channels disposed therein, the method comprising:

scanning at least some of the narrowband channels to determine signal strengths in at least some of the narrowband channels;

determining a threshold based on the signal strengths in at least some of the narrowband channels; and filtering the wideband communication signal at a frequency corresponding to a narrowband channel having a signal strength exceeding the threshold.

12. The method of claim 11, wherein a signal strength at which filtering is enabled is higher than a signal strength at which filtering is disabled.

13. The method of claim 11, wherein the wideband communication signal comprises a spread spectrum signal.

14. The method of claim 11, wherein the wideband communication signal comprises a code-division multiple access (CDMA) signal.

15. The method of claim 11, wherein the narrowband channels comprise channels of an analog cellular telephone system.

16. The method of claim 15, wherein the analog cellular telephone system comprises an analog mobile phone system (AMPS).

17. The method of claim 11, wherein filtering the wideband communication signal comprises filtering the wideband communication signal at a frequency corresponding to a narrowband channel having the strongest signal strength.

18. The method of claim 11, wherein determining the threshold comprises averaging at least some of the signal strengths in at least some of the narrowband channels.

19. The method of claim 18, wherein determining the threshold comprises not including a number of the largest signal strengths when determining the average of at least some of the signal strengths in at least some of the narrowband channels.

20. The method of claim 18, wherein determining the threshold comprises adding an offset to the average of at least some of the signal strengths in at least some of the narrowband channels.

21. The method of claim 11, wherein filtering the wideband communication signal comprises tuning a notch filter to suppress a frequency of the wideband communication signal corresponding to a narrowband channel having a signal strength exceeding the threshold.

22. The method of claim 11, further comprising filtering the wideband communication signal at a plurality of frequencies corresponding to a plurality of narrowband channels having signal strengths exceeding the threshold.

23. The method of claim 22, wherein the plurality of frequencies that are filtered are the frequencies corresponding to narrowband channels having signal strengths that exceed the threshold by the largest margins.

24. The method of claim 22, wherein the plurality of frequencies that are filtered are prioritized according to margins by which their signal strengths exceed the threshold.

25. The method of claim 11, wherein filtering comprises:

frequency shifting the wideband communication signal from an original frequency position until one of the narrowband channels having a signal strength exceeding the threshold is at a notch frequency of a notch filter, thereby producing a frequency shifted wideband communication signal;

removing interference from the frequency shifted wideband communication signal by filtering the frequency shifted wideband communication signal to produce a filtered wideband communication signal; and frequency shifting the filtered wideband communication signal back to the original frequency position.

26. The method of claim 25, wherein filtering comprises:

frequency shifting the filtered wideband communication signal from the original frequency position until a second one of the narrowband channels having a signal strength exceeding the threshold is at a notch frequency of a notch filter, thereby producing a second frequency shifted wideband communication signal;

removing interference from the second frequency shifted wideband communication signal by filtering the second frequency shifted wideband communication signal to produce a second filtered wideband communication signal; and frequency shifting the second filtered wideband communication signal back to the original frequency position.

27. A system adapted to detect and eliminate narrowband interference in a wideband communication signal having a frequency bandwidth with narrowband channels disposed therein, the system comprising:

a scanner adapted to scan at least some of the narrowband channels to determine signal strengths in at least some of the narrowband channels;

a notch module adapted to receive the wideband communication signal and to selectively remove narrowband interference from the wideband communication signal to produce a filtered wideband communication signal; and a controller coupled to the scanner and to the notch module, wherein the controller is adapted to determine a threshold based on the signal strengths in at least some of the narrowband channels and to control the notch module to filter the wideband communication signal at a frequency corresponding to a narrowband channel having a signal strength exceeding the threshold.

28. The system of claim 27, wherein a signal strength at which the controller controls the notch module to remove narrowband interference is higher than a signal strength at which the controller controls the notch module not to remove narrowband interference.

29. The system of claim 27, wherein the wideband communication signal comprises a spread spectrum signal.

30. The system of claim 27, wherein the wideband communication signal comprises a code-division multiple access (CDMA) signal.

31. The system of claim 27, wherein the narrowband channels comprise channels of an analog cellular telephone system.

32. The system of claim 31, wherein the analog cellular telephone system comprises an analog mobile phone system (AMPS).

33. The system of claim 27, wherein the controller is further adapted to store a list of narrowband channels having signal strengths that exceed the threshold.

34. The system of claim 33, wherein the controller is further adapted to prioritize the list of narrowband channels based on their signal strengths.

35. The system of claim 33, wherein the controller is further adapted to output the list of narrowband channels having signal strengths that exceed the threshold.

36. The system of claim 35, wherein the system uses the list for diagnostic purposes including signal analysis functions.

37. The system of claim 27, wherein the controller is further adapted to control the notch module to filter the wideband communication signal at a frequency corresponding to a narrowband channel having the strongest signal strength that exceeds the threshold.

38. The system of claim 27, wherein the controller is adapted to determine the threshold by determining an average of at least some of the signal strengths of the narrowband channels.

39. The system of claim 27, wherein the notch module is a first notch module and the filtered wideband communication signal is a first filtered wideband communication signal, the system further comprising a second notch module adapted to receive the first filtered wideband communication signal from the first notch module and to selectively filter the first filtered wideband communication signal at a frequency corresponding to a second narrowband channel to produce a second filtered wideband communication signal.

40. The system of claim 39, wherein the second notch module is tuned to a frequency corresponding to a narrowband channel having a signal strength exceeding the threshold.

41. The system of claim 39, wherein the first notch module removes a first narrowband interference signal from the wideband communication signal and the second notch module removes a second narrowband interference signal from the wideband communication signal.

42. The system of claim 41, wherein the first and second narrowband interference signals have different center frequencies.

43. The system of claim 37, wherein the notch module comprises:
a programmable phase locked loop coupled to the controller, the programmable phase locked loop adapted to generate a reference signal;
a first mixer adapted to receive the wideband communication signal and the reference signal and to shift the wideband communication signal in frequency from an original frequency position until one of the narrowband channels having a signal strength exceeding the threshold is located at an intermediate frequency, thereby creating a frequency shifted wideband communication signal;
a filter coupled to the first mixer and having a notch located at the intermediate frequency, the filter adapted to receive the frequency shifted wideband communication signal from the first mixer and to reduce frequency components of the wideband communication signal that are located at the intermediate frequency to produce a filtered wideband communication signal; and
a second mixer coupled to the filter and adapted to receive the filtered wideband communication signal and the reference signal and to shift the filtered wideband communication signal in frequency back to the original frequency position.

44. The system of claim 43, further comprising a second notch module comprising:
a second programmable phase locked loop coupled to the controller, the second programmable phase locked loop adapted to generate a second reference signal;
a third mixer adapted to receive the filtered wideband communication signal and the second reference signal and to shift the filtered wideband communication signal in frequency from the original frequency position until a second one of the narrowband channels having a signal strength exceeding the threshold is located at the intermediate frequency, thereby creating a second frequency shifted wideband communication signal;
a second filter coupled to the third mixer and having a notch located at the intermediate frequency, the second filter adapted to receive the second frequency shifted wideband communication signal from the third mixer and to reduce frequency components of the second filtered wideband signal that are located at the intermediate frequency to produce a second filtered wideband communication signal; and
a fourth mixer coupled to the second filter and adapted to receive the second filtered wideband communication signal and the second reference signal and to shift the second filtered wideband communication signal in frequency back to its original frequency position.

45. The system of claim 27, wherein the notch module further comprises a bypass switch coupled to the controller and adapted to be controlled by the controller to bypass the notch module when no narrowband channel has a signal strength exceeding the threshold.

46. A method of detecting, eliminating and reporting narrowband interference in a wideband communication signal having a frequency bandwidth with narrowband channels disposed therein, the method comprising:
scanning at least some of the narrowband channels to determine signal strengths in at least some of the narrowband channels;
determining a threshold based on the signal strengths in at least some of the narrowband channels;
filtering the wideband communication signal at a frequency corresponding to a narrowband channel having a signal strength exceeding the threshold;
storing a list of narrowband channels having signal strengths that exceed the threshold; and
outputting the list of narrowband channels having signal strengths that exceed the threshold.

47. The method of claim 46, wherein the list of narrowband channels having signal strengths that exceed the threshold is prioritized based on signal strength.

48. The method of claim 47, wherein diagnostic purposes comprises signal analysis functions.

49. The method of claim 46, wherein the wideband communication signal comprises a spread spectrum signal.

50. The method of claim 46, wherein the wideband communication signal comprises a code-division multiple access (CDMA) signal.

51. The method of claim 46, wherein the narrowband channels comprise channels of an analog cellular telephone system.

52. The method of claim 51, wherein the analog cellular telephone system comprises an analog mobile phone system (AMPS).

53. A method of selecting a threshold for use in detecting narrowband interference within a bandwidth of a wideband communication signal, the method comprising:

tuning a receiver to a plurality of frequencies within the bandwidth having substantially no narrowband interference to produce a plurality of signal strength indications;

comparing a threshold voltage to a voltage representation of each of the plurality of signal strength indications;

setting the threshold voltage until the threshold voltage exceeds each of the plurality of signal strength indications;

tuning the receiver to a frequency having narrowband interference to produce an interference signal strength indication;

comparing the threshold voltage to a voltage representation of the interference signal strength indication; and ensuring that the voltage representation of the interference signal strength indication exceeds the voltage representation of the threshold.

54. The method of claim 53, wherein tuning the receiver to a plurality of frequencies within the bandwidth having substantially no narrowband interference comprises tuning the receiver to a plurality of narrowband channels within the wideband communication signal.

55. The method of claim 53, wherein tuning the receiver to a plurality of frequencies within the bandwidth having substantially no narrowband interference comprises sweeping the tuning of the receiver across a plurality of frequencies.

56. An interference detection and suppression system adapted to detect and eliminate narrowband interference in a wideband communication signal having a frequency bandwidth with narrowband channels disposed therein, the system comprising:

a notch filter for filtering the wideband communication signal at a frequency corresponding to a selected one of the narrowband channels;

a bypass switch adapted to selectively bypass the wideband communications signal around the notch filter;

a receiver adapted to be tuned to a narrowband channel and to produce a voltage signal strength indication pertaining to the channel to which the receiver is tuned;

a threshold setting device adapted to produce a voltage signal representative of a threshold to which the device is set; and a comparator coupled to the receiver, the threshold setting device and the bypass switch, wherein the comparator controls the bypass switch to selectively bypass the notch filter based on a comparison of the voltage signal representative of the threshold and the voltage signal strength indication.

57. The system of claim 56, wherein the receiver comprises a scanning receiver adapted to sequentially tune to the narrowband channels and to produce a voltage signal strength indication pertaining to each channel to which the receiver is tuned.

58. The system of claim 57, further comprising a sample and hold circuit adapted to prevent the scanning receiver from scanning when the comparator detects that the voltage signal strength indication exceeds the voltage signal representative of the threshold.

59. The system of claim 56, wherein the comparator controls the bypass switch not to bypass the notch filter when the voltage signal strength indication exceeds the voltage signal representative of the threshold.

60. The system of claim 59, wherein the comparator controls the bypass switch to bypass the notch filter when the voltage signal representative of the threshold exceeds the voltage signal strength indication.

61. A method of detecting and suppressing interference in a wideband communication signal having a frequency bandwidth with narrowband channels disposed therein, the method comprising:

tuning a receiver to a narrowband channel to produce a voltage signal strength indication corresponding to the channel to which the receiver is tuned;

setting a threshold to produce a voltage signal representative of a threshold;

selectively filtering with an adaptive notch filter a selected one of the narrowband channels based on a comparison of the voltage signal representative of the threshold and the voltage signal strength indication; and selectively bypassing a selected one of the narrowband channels based on a comparison of the voltage signal representative of the threshold and the voltage signal strength indication.

62. The method of claim 61, further comprising scanning the receiver across a frequency range to sequentially tune to the narrowband channels and to produce a voltage signal strength indication pertaining to each channel to which the receiver is tuned.

63. The method of claim 62, further comprising the step of stopping the receiver from scanning when the voltage signal strength indication exceeds the voltage signal representative of the threshold.

64. The method of claim 61, wherein the adaptive notch filter does not filter the selected one of the narrowband channels when the voltage signal representative of the threshold exceeds the voltage signal strength indication.

65. The method of claim 61, wherein the adaptive notch filter filters the selected one of the narrowband channels when the voltage signal strength indication exceeds the voltage signal representative of the threshold.

* * * * *

UNITED STATES PATENT AND TRADEMARK OFFICE
CERTIFICATE OF CORRECTION

PATENT NO.   : 6,807,405 B1
DATED        : October 19, 2004
INVENTOR(S)  : Charles E. Jagger et al.

It is certified that error appears in the above-identified patent and that said Letters Patent is hereby corrected as shown below:

Title page,
Item [57], ABSTRACT,
Lines 4-5, "data.frame" has been deleted and -- data frame -- has been inserted in its place.
Line 5, "20 ms" has been deleted and -- 20ms -- has been inserted in its place.
Lines 7, 20 and 24, "interferer" has been deleted and -- interferor -- has been inserted in its place.

Column 8,
Line 63, "and-bandpass" has been deleted and -- and bandpass -- has been inserted in its place.
Line 67, "interferer" has been deleted and -- interferor -- has been inserted in its place.

Signed and Sealed this

Nineteenth Day of July, 2005

JON W. DUDAS
*Director of the United States Patent and Trademark Office*